United States Patent Office 3,155,730
Patented Nov. 3, 1964

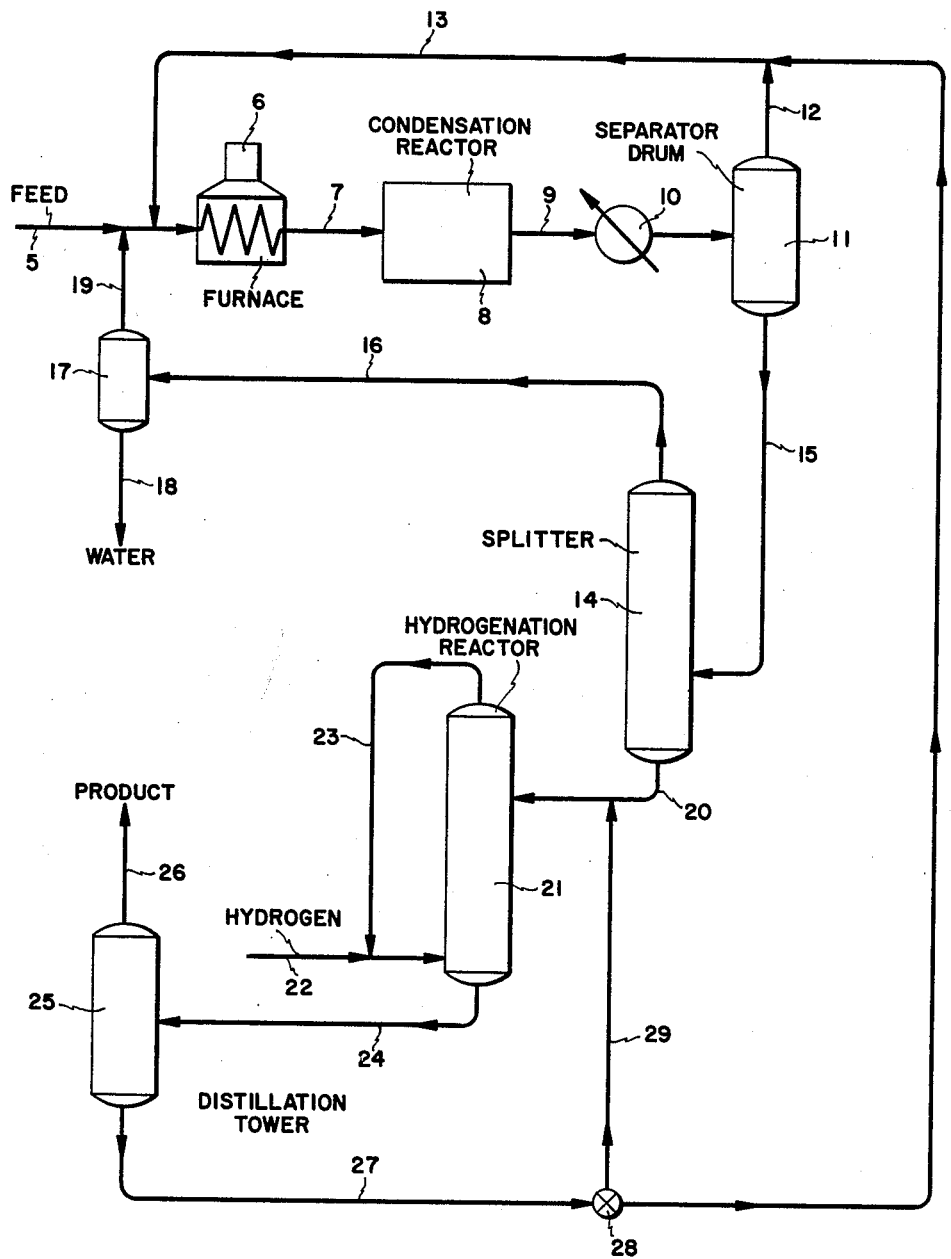

3,155,730
PROCESS FOR PREPARING KETONES
Jackson Eng, Sarnia, Ontario, Canada, assignor to Esso Research and Engineering Company, a corporation of Delaware
Filed May 18, 1962, Ser. No. 195,772
9 Claims. (Cl. 260—593)

The present invention relates to a process for preparing ketones from oxygenated compounds. More particularly the invention concerns the use of novel catalysts for the vapor phase conversion of low molecular weight alcohols and/or ketones, such as isopropanol and acetone to higher molecular weight ketones, such as mesityl oxide. Specifically, the invention involves carrying out the aforementioned conversion in the presence of a solid catalyst comprising a mixture of magnesium oxide and calcium carbonate.

It is known in the art that acyclic alcohols can be dehydrogenated to make ketones that can be condensed at elevated temperatures to form ketone condensation products. For instance, isopropanol can be dehydrogenated to make acetone which condenses to form mesityl oxide, an unsaturated ketone. Mesityl oxide is readily hydrogenated in the presence of a suitable catalyst, such as nickel, at 140 to 270° F. under 1 to 25 atmospheres of hydrogen to produce methylisobutyl ketone (MIBK). The higher molecular weight ketones, especially MIBK and mesityl oxide, are useful as solvents for many organic substances, such as vinyl resins, polyacrylic esters and organic salt resins.

One difficulty which has been encountered in this process relates to the relatively low conversion of the lower molecular weight ketone to the higher molecular weight ketone that is obtained employing ordinary condensation catalysts. Low conversion rates require separating large quantities of ketone feed from the product and recycling it to the reaction zone. While there have been recently discovered certain types of catalysts which will effect relatively high conversions with good selectivities, these catalysts are expensive. For example, supported and unsupported mixtures of zinc oxide and zirconium oxide, have been found to be excellent ketone condensation catalysts yielding both relatively high conversions and excellent selectivities, e.g. to mesityl oxide in the case of employing acetone as the feed. These catalysts, however, have a current price range, depending on purity and other factors, of 30 to 45¢ per pound.

It has now been discovered that essentially the same excellent selectivities and high conversions of lower molecular weight alcohols and/or ketones to higher ketones can be obtained by employing catalysts comprising magnesium oxide and calcium carbonate. These catalysts are effective with or without hydrogen pressures; however, by feeding hydrogen into the condensation reactor, a substantial increase in the amount of higher ketone formed per pass is obtained, and in addition catalyst life is increased. More specifically, the catalyst employed in the present invention is a mixture comprising calcium carbonate and 10–200 wt. percent magnesium oxide based on calcium carbonate and preferably 15 to 65 wt. percent MgO on $CaCO_3$. While in a preferred embodiment these two components will constitute the major portion of the catalyst composition, in certain cases it may be desirable to employ a conventional carrier or filler such as coke, Alundum, char, diatomaceous earth, pumice or ceramic material. The active components, i.e. MgO and $CaCO_3$ may represent from 20 to 100 wt. percent of the entire catalyst. In addition, minor amounts, i.e. up to about 5 wt. percent on MgO and $CaCO_3$ of other components such as $SiO_2$, $Al_2O_3$, $Fe_2O_3$, or other inorganic salts and oxides usually found in various naturally occurring minerals are tolerable and do not appear to adversely affect the condensation reaction. Thus in accordance with this invention one may use certain naturally occurring minerals which after treatment will comprise as principal components MgO and $CaCO_3$. As a preferred example Brucitic limestone is a naturally occurring mineral consisting essentially of $Mg(OH)_2 \cdot CaCO_3$ with 2–3 wt. percent of silica, presumably in the form of silicates.

Natural Brucitic limestone, however, is a poor catalyst and must in accordance with this invention be treated to convert the magnesium hydroxide to magnesium oxide without disturbing the calcium carbonate. By partial calcination, that is heat treatment for 0.5 to 6 hours at a temperature of 400° to 800° C., a selective decomposition of the magnesium hydroxide to magnesium oxide can be effected. Care should be taken to avoid excess amounts of either magnesium oxide or calcium carbonate, that is, amounts outside of the ranges specified above, since it has been found that a calcium carbonate catalyst in the substantial absence of magnesia results in very low conversions and would be uneconomic. On the other hand, when magnesium oxide is employed to the essential exclusion of calcium carbonate, selectivity to the desired mesityl oxide is extremely poor and also uneconomic. While the catalyst of this invention may be prepared by physically admixing magnesium oxide and calcium carbonate, this procedure is less preferred due to the cost involved as compared to simply heat treating a naturally occurring mineral. However, the preparation of such synthetic mixtures is still less costly than the zirconia-zinc oxide catalyst referred to above and is within the purview of this invention. As an example of the marked savings obtainable by resort to this invention, magnesium oxide-calcium carbonate catalyst obtained by the partial calcination of Brucite is currently available at a cost of less than about two cents per pound. Other minerals containing the magnesuim oxide-calcium carbonate mixture within the ranges specified above, or inorganic salts which are precursors to these compounds, are magnesia, dolomitic limestones and others.

Since Brucitic limestone is readily available and has been found to be exceptionally effective both from a conversion and selectivity standpoint, a typical analysis of this partially calcined mineral is given below, it being understood that the specific composition of this mineral will vary within certain limits.

TYPICAL ANALYSIS OF BRUCITIC LIMESTONE (A) Inspection after Ignition:
    MgO _____ 26.1
    CaO _____ 39.6
    $SiO_2$ _____ 2.4
    Loss on Ignition _____ 31.9

(B) Composition of Partially Calcined Catalyst:

| | |
|---|---|
| MgO | 27.5 |
| $CaCO_3$ | 70.5 |
| $SiO_2$ | 2.0 |
| (Other components) | Trace |

Physically the catalyst may be in any solid form although for optimum vapor solid contact in a fixed bed system it is preferred to employ reasonably coarse solids of a size from 3 to 28, and preferably 6 to 12 mesh which can be obtained by crushing the mineral prior or subsequent to partial calcination.

The accompanying drawing is a flow diagram of a preferred embodiment of the invention.

In carrying out one embodiment of the invention, which can be a batch or continuous process, a vaporized feed comprising a low molecular weight saturated acyclic hydrocarbon ketone or alcohol preferably having a boiling point between about 120 and 185° F. is introduced into a reaction zone containing the catalyst described above.

The feed is preferably but not necessarily preheated so that it enters the reaction zone in the form of a vapor at approximately the reaction temperature. It has been found that good results are obtained employing a fixed catalyst bed either in an isothermal or an adiabatic reactor (such as that described in U.S. Patent 2,835,706, issued to C. E. Cordes). The pressure in the reactor should be maintained at about 0.5 to 100 atmospheres and the temperature between about 400 and 900° F. While temperatures up to 1000° F. may be employed, the catalyst activity is adversely affected at higher temperatures due to the deposition of higher molecular weight by-products, such as isophorone, on the surface of the catalyst.

The optimum conditions for effecting the condensation are bed temperatures of 600 or 800° F. and pressures of 0–1000 p.s.i.g., although pressures up to about 2000 p.s.i.g. may be employed. While the higher pressures increase conversion, they adversely affect selectivity. It has been found that the use of low feed partial pressures and/or high velocities will effect a good compromise between conversion and selectivity. While the space velocity is not critical, it is generally advantageous to pass the feed through the reaction zone at a space velocity based on liquid feed of 0.1 to 5 v./v./hr.

Increased yields of higher molecular weight ketone product, both saturated and unsaturated, are obtained when hydrogen is introduced into the reaction zone, either separately or admixed with the vaporized feed. While high concentration of hydrogen reduces the conversion level, this deficit may be offset by increased catalyst life which accompanies the use of hydrogen. Thus the mole ratio of hydrogen to acetone may vary between 0 to 5:1, preferably 0.5 to 3:1.

The catalysts of this invention can be regenerated by simply heating them to about 370 to 650° C. in the presence of air to burn off contaminants. However, care should be taken to avoid decomposition of the calcium carbonate.

The reaction products of the condensation step comprise mainly unsaturated higher molecular weight ketones, such as mesityl oxide, and minor amounts of saturated aliphatic and cyclic ketones, such as methylisobutyl ketone, phorone and isophorone.

While acetone is the preferred feed for this reaction, alcohols, especially isopropanol, and other oxygenated organic compounds, preferably saturated aliphatic compounds having 3 to 6 carbon atoms, such as methylethyl ketone, methylpropyl ketone and methylbutyl ketone, may be used to prepare higher unsaturated carbonyl compounds which can be hydrogenated to form ketones of increased molecular weight.

If an alcohol, such as isopropanol, is used as the feed, the first reaction is a dehydrogenation to make the corresponding ketone which is then condensed to form higher molecular weight ketones. Mixed alcohol and ketone feeds are employable if desired.

The reaction products of the condensation step, withdrawn from the reaction zone, are separated by any suitable technique as fractional distillation. Any uncondensed feed, e.g. acetone, is recycled to the condensation reaction zone. The unsaturated ketone product, e.g. mesityl oxide, is then converted to saturated ketone product by introducing it into a hydrogenation zone which is at 140° to 270° F. and under 1 to 25 atmospheres of hydrogen pressure, hydrogenating the feed in the presence of a suitable hydrogenation catalyst, such as nickel, cobalt molybdate or copper chromite and recovering the saturated ketone, e.g. by distillation. These steps which occur after the condensation reaction are conventional and well known in the art.

Referring now to the drawing, one embodiment of the invention a mixture of pure acetone and hydrogen (in a molal ratio of 1 to 3) in line 5 is pumped through a furnace 6 to preheat the feed to 500 to 600° F. The preheated feed containing hydrogen is withdrawn from furnace 6 through line 7 and introduced into adiabatic condensation reactor 8, which is at approximately atmospheric pressure, at a space velocity of 0.25 to 0.75 v./v./hr. Alternatively, the reactor bed may be heated in an isothermal reactor to the reaction temperature, in which case cold feed may be injected into the reactor. A substantial amount of the acetone in the feed is converted to mesityl oxide and MIBK. While the drawing shows only one reactor, a plurality of condensation reactors may be used. The reactor contains a fixed bed of catalyst particles already described. The reaction mixture is withdrawn from reactor 8 via line 9 and is cooled to about 100° F. by cooling means 10 to condense most of the acetone, mesityl oxide and heavier products in the reaction mixture prior to introducing the mixture into the separation drum 11. The unreacted hydrogen gas is disengaged from the condensation products in drum 11 and recycled to the feed line 5 via lines 12 and 13. The recycled hydrogen usually contains a small quantity, e.g. about 0.25 mole percent, of acetone. The liquid product in drum 11 is pumped into a splitter 14 through line 15 wherein acetone, isopropanol and water are separated from mesityl oxide and the heavier products. Splitter 14 is operated at about 180° F. and 1 atmosphere pressure. The overhead product which contains acetone, isopropanol and water is withdrawn from splitter 14 through line 16 and introduced into a second splitter 17, which is also at atmospheric pressure and a somewhat lower temperature, to remove substantially all of the water from the overhead stream. The water is withdrawn from the splitter 17 through line 18 and the almost water-free ketone and alcohol are recycled to feed line 5 through line 19. The mesityl oxide and heavier materials are withdrawn from the bottom of splitter 14 through line 20 and introduced into hydrogenation reactor 21 at space velocities of 0.1 to 20 v./v./hr. where it contacts hydrogen introduced into reactor 21 through line 22. The hydrogenation takes place in the liquid phase at about 165° F. under about 10 atmospheres pressure in the presence of a nickel or other hydrogenation catalyst that favors the saturation of double bonds. The hydrogenation reactor is equipped with a heat exchanger means in order to withdraw the heat of reaction from the vessel. If desired, the mesityl oxide and MIBK withdrawn from the bottom of splitter 14 may first be split in a tower (not shown) to remove the heavier materials (mesitylene, phorone, and isophorone) before it is introduced into hydrogenation reactor 21. The unreacted hydrogen is withdrawn from hydrogen reactor 21 through line 23 and recycled to the hydrogen feed stream in line 22. The hydrogenated mesityl oxide is withdrawn from the bottom of reactor 21 through line 24 and introduced into distillation tower 25 which is operated at atmospheric pressure to separate the MIBK product from unreacted mesityl oxide, MIBC and other high boiling materials. Pure MIBK (99.5%) is withdrawn from distillation tower 25 overhead through line 26. The bottom product of distillation tower 25 is withdrawn through line 27 and a part or all of the bottoms product in line 27 may be recycled to the hydrogenation reactor via valve 28 and lines 29 and 20, or it may be recycled to feed line 5 via line 13. If the hydrogenated product in line 24 contains a significant amount of acetone and isopropanol, these substances may be removed in a stripper (not shown) prior to introducing the hydrogenated product into distillation tower 25.

The following examples demonstrate how the process of the present invention may be carried out and its advantages over processes in which supported catalysts are used.

*Example 1*

A reactor approximately 30 inches long and 1 inch in diameter was packed with 6 to 12 mesh size particles of partially calcined Brucitic lime having the specific composition aforedescribed. The reactor embodied means for maintaining the catalyst bed at elevated temperatures. After preheating the catalyst bed to a temperature of 700° F. cold acetone and hydrogen were passed through the bed at a pressure of 10 p.s.i.g. while maintaining the bed temperature at about 700° F. The acetone feed rate was 0.50 v./v./hr. with a hydrogen rate of 1906 s.c.f./b. (standard cubic feet per barrel of liquid acetone). The vapor product was continuously removed from the reactor and condensed to separate hydrogen therefrom. A product analysis of the condensed liquid showed 7.1 wt. percent mesityl oxide, 2.7% isomesityl oxide, 0.8% methylisobutyl ketone and 84.4% of acetone, the remaining compounds being isopropanol, phorone, isophorone and mesitylene. In this condensation reaction there was obtained 18.1% conversion of acetone with a 71.7% selectivity to mesityl oxides.

The results obtained employing the processing conditions of Example 1 are compared with those of two additional examples in the following Table I.

TABLE I

| Examples | 1 | 2 | 3 |
|---|---|---|---|
| Reaction Conditions: | | | |
| Catalyst | (1) | (1) | (1) |
| Temp. °F | 700 | 500 | 700 |
| Press., p.s.i.g | 10 | 10 | 800 |
| Feed rate, v./v./hr | 0.56 | 0.53 | 0.53 |
| $H_2$, s.c.f./b | 1,906 | 1,558 | 1,963 |
| Liquid Product Analysis: | | | |
| Mesityl oxide, wt. percent | 7.1 | 2.9 | 11.9 |
| Isomesityl oxide | 2.7 | 0.7 | 2.7 |
| Methylisobutyl ketone | 0.8 | | 1.0 |
| | 10.6 | 3.6 | 15.6 |
| Acetone | 84.4 | 95.2 | 72.7 |
| Isopropanol | 0.6 | 0.5 | 0.7 |
| Phorone | 0.8 | 0.3 | 5.4 |
| Isophorone | 2.9 | 0.4 | 3.9 |
| Mesitylene | 0.7 | | 1.7 |
| Conversion of acetone, percent [2] | 18.1 | 5.6 | 31.4 |
| Selectivity to mesityl oxides, percent [3] | 71.7 | 88.3 | 62.8 |

[1] $MgO \cdot CaCO_3$—Partially calcined Brucitic limestone.
[2] Defined as:
$$\frac{\text{Wt. of acetone converted}}{\text{Wt. of acetone feed}} \times 100$$
[3] Defined as:
$$\frac{\text{Mols of mesityl oxides and MIBK in product}}{\text{Total mols of hydrocarbon in product excluding acetone}} \times 100$$

A comparison of the three examples in Table I shows that the use of relatively high pressures and/or high temperatures effect increased conversions of acetone but at the expense of selectivity to mesityl oxide.

To compare the effectiveness of the low cost catalyst of this invention with the prior art catalysts of recognized efficiencies, reference may be had to Table II, showing Examples 4–7.

TABLE II

| Examples | 4 | 5 | 6 | 7 |
|---|---|---|---|---|
| Catalyst | $ZrO_2$-ZnO [1] on Coke | $ZrO_2$-ZnO, No Base | ZnO on Coke | $MgO \cdot CaCO_3$ (Partially Calcined Brucitic Limestone) |
| Treat Conditions: | | | | |
| Temp. °F | 694 | 697 | 803 | 700 |
| Press., p.s.i.g | 0 | 0 | 0 | 10 |
| Feed rate, v./v./hr | 0.48 | 0.30 | 0.93 | 0.50 |
| $H_2$, s.c.f./b | 1,835 | 2,300 | 3,700 | 1,906 |
| Liquid Product Analysis, Wt. Percent: | | | | |
| Mesityl oxide | 8.39 | 8.27 | 5.69 | 7.1 |
| Isomesityl oxide | 2.91 | 2.87 | 4.08 | 2.7 |
| Methyl isobutyl ketone | 0.69 | 0.34 | 0.40 | 0.8 |
| Total MIBK equiv | 11.99 | 11.48 | 10.17 | 10.6 |
| Acetone | 81.80 | 80.50 | 82.93 | 84.4 |
| Water | 3.56 | 4.86 | 5.11 | |
| Isopropanol | 1.33 | 2.06 | 1.37 | 0.6 |
| Phorone | 0.62 | 0.39 | 0.28 | 0.8 |
| Isophorone | 0.46 | 0.42 | 0 | 2.9 |
| Mesitylene | 0.24 | 0.29 | 0.14 | 0.7 |
| Conversion, percent [2] | 17.3 | 17.4 | 14.3 | 18.1 |
| Selectivity to mesityl oxide, percent [3] | 79.2 | 73.4 | 79.9 | 71.7 |

[1] 6/12 mesh, 18% $ZrO_2$–82% ZnO, 20% oxides on coke.
[2] Defined as:
$$\frac{\text{Wt. of acetone converted}}{\text{Wt. of acetone feed}} \times 100$$
[3] Defined as:
$$\frac{\text{Mols of mesityl oxides and MIBK in product}}{\text{Total mols of hydrocarbon in product excluding acetone}} \times 100$$

In Table II comparative runs were carried out with $ZrO_2$–ZnO catalyst on a coke base, $ZrO_2$–ZnO unsupported, and ZnO on coke. It will be seen from the conversions and selectivities that the magnesium oxide-calcium carbonate catalyst of this invention is essentially as effective in this condensation reaction insofar as conversion is concerned and compares well with regard to selectivity of acetone to mesityl oxide.

Surprisingly calcium carbonate and magnesium oxide when employed separately as condensation catalysts have been found to be deficient in several respects. In particular, calcium carbonate by itself is incapable of effecting economically acceptable conversion levels. While magnesium oxide employed alone does promote reasonably good conversions, e.g. 25–27 wt. percent, the accompanying selectivities to mesityl oxide are extremely low and unacceptable for a commercial process. A comparison between the $MgO \cdot CaCO_3$ catalyst of this invention with $CaCO_3$ and MgO employed individually is shown in the following Table III.

TABLE III

| Examples | 8 | 9 | 10 | 11 | 12 | 13 |
|---|---|---|---|---|---|---|
| Catalyst | $MgO \cdot CaCO_3$ (Partially Calcined Brucitic Lime) | | $CaCO_3$ | | MgO | |
| Process Conditions: | | | | | | |
| Temp. °F | 700 | 700 | 700 | 700 | 700 | 700 |
| Press., p.s.i.g | 10 | 800 | 20 | 800 | 25 | 810 |
| Feed rate, v./v./hr | 0.56 | 0.53 | 0.58 | 0.48 | 0.55 | 0.48 |
| $H_2$, s.c.f./b | 1,906 | 1,963 | 1,745 | 2,320 | 1,825 | 1,870 |
| Liquid Product Analysis: | | | | | | |
| Mesityl oxide, wt. percent | 7.1 | 11.9 | 0.2 | 1.2 | 2.2 | 1.7 |
| Isomesityl oxide | 2.7 | 2.7 | Trace | 0.2 | 7.0 | 7.2 |
| Methyl isobutyl ketone | 0.8 | 1.0 | Nil | Nil | 0.2 | 0.4 |
| | 10.6 | 15.6 | 0.2 | 1.4 | 9.4 | 9.3 |
| Acetone | 84.4 | 72.7 | 99.8 | 95.8 | 78.1 | 77.0 |
| Isopropanol | 0.6 | 0.7 | Nil | 2.1 | 0.1 | 0.5 |
| Phorone | 0.8 | 5.4 | Nil | 0.6 | 0.9 | 1.6 |
| Isophorone | 2.9 | 3.9 | Nil | Trace | 11.0 | 10.3 |
| Mesitylene | 0.7 | 1.7 | Trace | 0.1 | 0.5 | 1.3 |
| Conversion of acetone, percent [1] | 18.1 | 31.4 | 0.2 | 4.7 | 25.7 | 26.9 |
| Selectivity of mesityl oxides, percent [2] | 71.7 | 62.8 | 100 | 26.5 | 52.3 | 50.0 |

[1] Defined as:
$$\frac{Wt. \text{ of acetone converted}}{Wt. \text{ of acetone feed}} \times 100$$

[2] Defined as:
$$\frac{Mols \text{ of mesityl oxides and MIBK in product}}{Total \text{ mols of hydrocarbon in product excluding acetone}} \times 100$$

What is claimed is:

1. In a process for condensing lower molecular weight oxygenated hydrocarbons selected from the group consisting of ketones and alcohols to produce higher molecular weight ketones wherein said lower molecular weight oxygenated hydrocarbon is contacted in the vapor phase with a catalyst, the improvement which comprises employing as said catalyst a mixture comprising calcium carbonate and from 10–200 weight percent magnesium oxide based on said calcium carbonate.

2. A process in accordance with claim 1 wherein said low molecular weight oxygenated hydrocarbon is acetone.

3. A process in accordance with claim 1 wherein said low molecular weight oxygenated hydrocarbon is isopropanol.

4. In a process for the preparation of mesityl oxide by condensing acetone at a temperature between 400–1000° F. in the presence of a condensation catalyst, the improvement which comprises employing as said condensation catalyst a mixture comprising calcium carbonate and from 10–200 wt. percent magnesium oxide based on calcium carbonate.

5. A process in accordance with claim 4 wherein magnesium oxide is present in an amount of from 15–65 wt. percent based on calcium carbonate.

6. A process in accordance with claim 5 wherein said catalyst is prepared by partially calcining a naturally occurring mineral containing $Mg(OH)_2$ and $CaCO_3$ at a temperature sufficient to dehydrate said $Mg(OH)_2$ but insufficient to decompose the $CaCO_3$.

7. A process in accordance with claim 6 wherein said mineral is Brucitic limestone.

8. In a process for preparing mesityl oxide wherein acetone in vapor phase is contacted with a condensation catalyst in a fixed bed at a temperature between 400–900° F. in the presence of hydrogen for a time sufficient to condense said acetone to mesityl oxide, the improvement which comprises employing as said condensation catalyst a mixture of calcium carbonate and 15–65 wt. percent magnesium oxide based on calcium carbonate.

9. A process in accordance with claim 8 wherein said catalyst is partially calcined Brucitic limestone.

References Cited in the file of this patent

UNITED STATES PATENTS

| 2,549,508 | Mottern | Apr. 17, 1951 |
| 2,549,844 | Mottern | Apr. 24, 1951 |
| 2,614,996 | Corson et al. | Oct. 21, 1952 |